United States Patent [19]

Miyamoto

[11] Patent Number: 5,157,599

[45] Date of Patent: Oct. 20, 1992

[54] SERIAL DATA COMMUNICATION SYSTEM AND APPARATUS

[75] Inventor: Ryosuke Miyamoto, Kanagawa, Japan

[73] Assignee: Canon Kabushiki Kaisha, Tokyo, Japan

[21] Appl. No.: 510,439

[22] Filed: Apr. 18, 1990

Related U.S. Application Data

[63] Continuation of Ser. No. 838,902, Mar. 12, 1986, abandoned.

[30] Foreign Application Priority Data

Mar. 13, 1985 [JP] Japan .................................. 60-048131

[51] Int. Cl.$^5$ .............................................. H04L 5/00
[52] U.S. Cl. .................................. 358/471; 364/240; 364/DIG. 1; 354/289.12; 340/825.06; 375/36
[58] Field of Search .................... 364/200, 514; 370/24, 370/31, 32; 340/825.17, 825.51; 455/78; 358/41, 209, 210, 229, 225; 354/286, 289, 289.12

[56] References Cited

U.S. PATENT DOCUMENTS

| | | | |
|---|---|---|---|
| 3,764,981 | 10/1973 | Takasugi | 340/825.51 |
| 3,967,059 | 6/1976 | Moore, III et al. | 370/31 |
| 4,038,644 | 7/1977 | Duke et al. | 364/900 |
| 4,281,380 | 7/1981 | DeMesa, III et al. | 364/200 |
| 4,288,869 | 9/1981 | Kolodzey et al. | 370/31 |
| 4,359,731 | 11/1982 | Beauford et al. | 340/825.51 |
| 4,384,307 | 5/1983 | Kuzmik et al. | 364/514 |
| 4,390,900 | 6/1983 | Van Kampen et al. | 364/514 |
| 4,432,064 | 2/1984 | Barker et al. | 364/550 |
| 4,437,752 | 3/1984 | Akashi et al. | 354/289.12 |
| 4,518,239 | 5/1985 | Tomori | 354/286 |
| 4,556,958 | 12/1985 | Ugon | 364/200 |
| 4,572,638 | 2/1986 | Nakai et al. | 354/286 |
| 4,589,719 | 7/1986 | Breen et al. | 370/31 |
| 4,602,252 | 7/1986 | Nakata et al. | 340/925.5 |
| 4,608,630 | 8/1986 | Schott | 364/200 |
| 4,652,873 | 3/1987 | Dolsen et al. | 340/825.5 |
| 4,654,655 | 3/1987 | Kowalski | 340/825.5 |
| 4,670,872 | 6/1987 | Cordill | 370/85 |
| 4,682,871 | 7/1987 | Metabi | 354/400 |
| 4,699,491 | 10/1987 | Ishimura | 354/286 |
| 4,710,943 | 12/1987 | Duley et al. | 375/7 |
| 4,790,649 | 12/1988 | Harada et al. | 354/400 |
| 4,803,509 | 2/1989 | Nakai et al. | 354/410 |
| 4,833,498 | 5/1989 | Kato et al. | 354/410 |
| 4,860,113 | 8/1989 | Miyamoto et al. | 358/225 |

FOREIGN PATENT DOCUMENTS

| | | | |
|---|---|---|---|
| 0245329 | 12/1985 | Japan | 370/31 |
| 0561302 | 6/1977 | U.S.S.R. | 370/31 |
| 2075314 | 11/1981 | United Kingdom | 370/32 |

OTHER PUBLICATIONS

Haagens et al., PCT/US83/01179, Publication date, Mar. 1, 1984 (01.03.84) Title: Digital Signal Transmission and Receiving Apparatus all.

Stremler, Introduction to Communication Systems 2nd Ed., 1982 pp. 1–4.

Rooney and Ismail, Microprocessors and Microcomputers, ©1984 pp. 226–242.

Primary Examiner—Parshotam S. Lall
Assistant Examiner—S. A. Melnick
Attorney, Agent, or Firm—Robin, Blecker, Daley & Driscoll

[57] ABSTRACT

A communication system for transmitting and receiving data serially, in which informations representing the operative positions of transmitters and receivers in two stations are passed through a single communication line, thus realizing a half-duplex communication.

36 Claims, 5 Drawing Sheets

SERIAL DATA COMMUNICATION SYSTEM AND APPARATUS

This application is a continuation of application Ser. No. 838,902, filed Mar. 12, 1986 now abandoned.

BACKGROUND OF THE INVENTION

1. Field of the Invention

This invention relates to a serial data communication system using serial data for half-duplex communication.

2. Description of the Prior Art

The data communication systems may be, as well known, divided into categories, namely the parallel and serial types. From the point of view of the transmission speed, the parallel communication is, of course, preferable. But, because of its necessity of an equal number of communication lines to the number of bits of data to be transmitted, it is inferior in cost advantage to the serial communication.

Also, in performing the serial communication, which of the full duplex and half-duplex communication methods is chosen is determined by taking into account the various factors such as cost and kinds of data to be transmitted. Most of the ordinary communication control systems employ the half-duplex communication method.

It has been customary that even this serial half-duplex communication system necessitates at least one data line and at least two busy lines which let one station know the operative position of a transmitter-receiver of the other station.

Yet, to realize a communication system having a great number of microprocessors, it is desired to reduce the required total number of lines thus simplifying the structure of construction.

SUMMARY OF THE INVENTION

With the foregoing in mind, it is a first object of the invention to provide a serial data communication system in which only one busy line suffices for detecting the operative positions of transmitter-receivers between two stations, while nevertheless permitting the serial half-duplex communication method t be employed.

A second object of the invention is to apply the serial data communication system to an imaging apparatus in which a serial data communication is carried out, whereby the states of a transmitter-receiver are made detectable by using only one busy line.

A third object of the invention is to provide a serial data communication system applied to an imaging apparatus having two stations therein between which serial data are communicated, whereby each other's operative positions of transmitter-receivers of the stations are made detectable by using only one busy line.

A further object of the invention is to provide a serial data communication system applied to an imaging apparatus having a lens portion and another portion besides the lens portion equipped with respective transmitter-receivers, whereby one busy line suffices in connecting two such transmitter-receivers with each other to detect each other's operative positions.

To achieve these objectives, the serial data communication system is constructed in such a way that the operative positions of a transmitter and a receiver of each other's station are tested based on single-line informations. In such a manner, the half-duplex communication is thus performed.

DETAILED DESCRIPTION OF THE PREFERRED EMBODIMENT

The present invention is next described in detail in connection with an embodiment thereof.

Figures 1A, 1B:
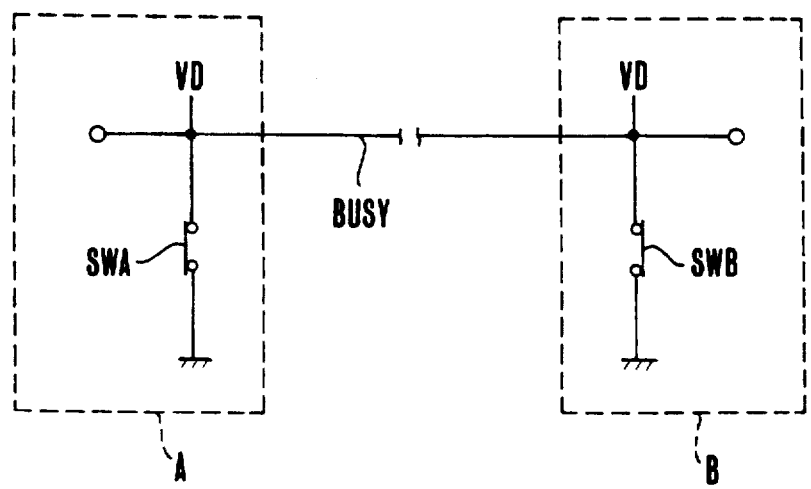
FIGS. 1A and 1B are respectively a schematic diagram and a table illustrating the principle of the invention.

In FIG. 1A, the fundamental principle of the invention is depicted. That is, it is through one busy line BUSY that two stations A and B communicate with each other. What logic level that busy line takes depending on the opening and closing states of two switches SWA and SWB at either terminal end of the busy line BUSY is shown in FIG. 1B.

The switches SWA and SWB are provided in the stations A and B respectively as shown in FIG. 1A. Either in the progress of transmission, or when ready to transmit data (for example, when the data to be transmitted is stored in a buffer, or a data transmission is requested), the one of the switches which is in the operator's station namely, SWA or SWB, is either in OFF state or opened. Conversely when there is no will to send, that switch SWA or SWB is left in ON state.

When in the receiving mode, these switches are operated in a similar manner to that described above. In more detail, when data are being received, the one of the switches which is in the receiving station is in OFF state. Conversely when waiting for data, that switch is left in ON state.

Now assuming that data are sent from station A to station B, then the operation is controlled as follows: At first, the switch SWA in station A is moved from ON to OFF state. Then, the logic level of the busy line BUSY is checked. If the busy line BUSY is found to be low level, (see row II in FIG. 1B), as this represents that the switch SWB in the receiving station B is in ON state (data waiting state), the data transmission from station A to station B is determined to be possible.

Conversely to this, if the level of the busy line BUSY is found high when the switch SWA of the transmitting station A is opened, as this represents that the switch SWB of the receiving station B is in OFF, the station B is determined as having will to send (or in the progress of transmitting). So it becomes impossible for the transmitting station A to send data.

In actual practice, to assure safety data communication, it is of great importance that before the start of data transmission, such checking of the busy line is repeated two or more times.

If it casually happens that the stations A and B start to send at the same time, the busy line BUSY takes high level (see row IV in FIG. 1B). This will lead to recycle the aforesaid checking countlessly. It is, therefore, preferable to give priority to one of the two stations A and B so that even when the switches SWA and SWB are simultaneously open, the host station (for example, station A) is allowed to transmit.

Figure 2:
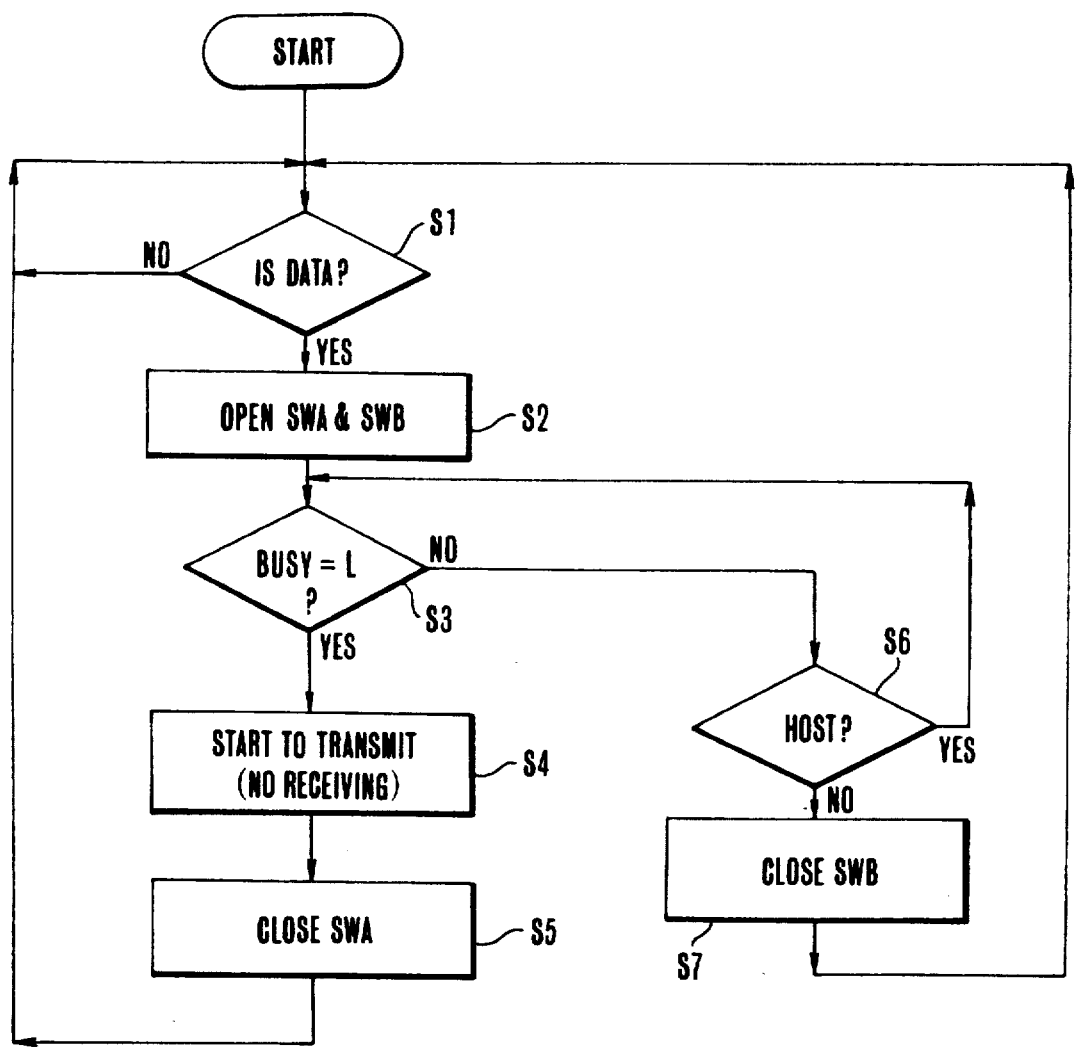
FIG. 2 is a flow chart of an example of transmission control program for the system of the invention.

The flow chart of FIG. 2 specifies a procedure of operations of checking the busy line, controlling the operation of the switches, and so on to allow for one of the two stations to be taken as the host, and to make it possible for the host station to get priority in transmission.

Now assuming that the station A is the host, and the station B is the lower rank station, and that both stations happen to transmit at the same time, how to control the procedure is explained by reference to the flow chart Data to be transmitted is first stored in a transmission buffer at each of the stations A and B. So the test for the presence of the data in step S1 results in opening both switches SWA and SWB in step S2. Because the busy line BUSY then changes its level to high, the test in step S3 results in NO. A loop then begins that the host station checks the level of the busy line BUSY again (Steps S3→S6→S3).

Meanwhile, as to the station B, because it is not assumed to be the host station, the test in step S6 results in NO, causing the switch SWB to be set in ON in step S7. Thus, another loop returns to the initial state (step S1).

Therefore, for the second time the station A checks the busy line BUSY, as the station B which is not the host has already set its switch SWB in ON, the station A is allowed to start transmission. (Step S3 to step S4). Since at this time the station B becomes the receiving station, it is hindered from starting a transmitting operation until the operation of the transmitting station A terminates.

For note, the terms "transmission start (unable to receive)" mean that when the station A starts to transmit, it "inhibits itself from performing the receiving operation".

As is obvious from the above-described flow chart, in case when the data to be transmitted are present in the host station, the checking of the busy line BUSY is recycled without limitation until the data become possible to be transmitted. In the other case when the data to be transmitted are in the station other than the host station, it is also possible to control so that he transmission is abandoned after some number of cycles of checking the busy line have been done, (or the state of the impossibility of transmission has been detected).

Figure 5:
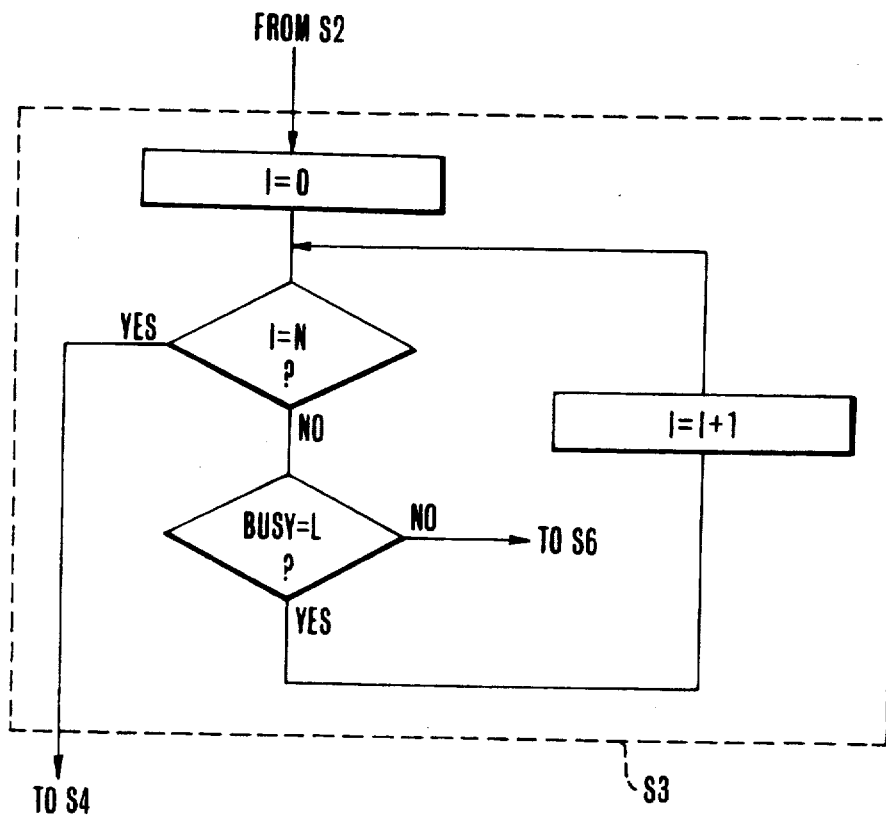
FIG. 5 is a flow chart illustrating an example of variation of the step S3 of FIG. 2.

Also, in the above-described step S3, it is possible to control so that the checking of the busy line is recycled two or more times as shown in FIG. 5. This is very advantageous. It is in the flow of FIG. 5 that the procedure of operation is specified so that a transmission starts only when the number of cycles of having detected that the busy line BUSY is low level reaches N (where N is an integer not less than 2). The reason why such a segment is introduced is that the use of only one cycle of checking the busy line does not provide a sufficient reliability in determining that the transmission is allowable, for, as the checking takes place in synchronism with the rising edge of the clock pulse, there is some possibility of making a level detection error. Particularly with the partner station when in the progress of transmission, it will lead to destroy the data Therefore, the detection error is fatal. Hence, the introduction of the segment that the checking of the busy line is recycled over a plurality of times for every one transmitting operation into the flowchart of determining whether or not the transmission is allowable produces a great advantage.

Figure 3:
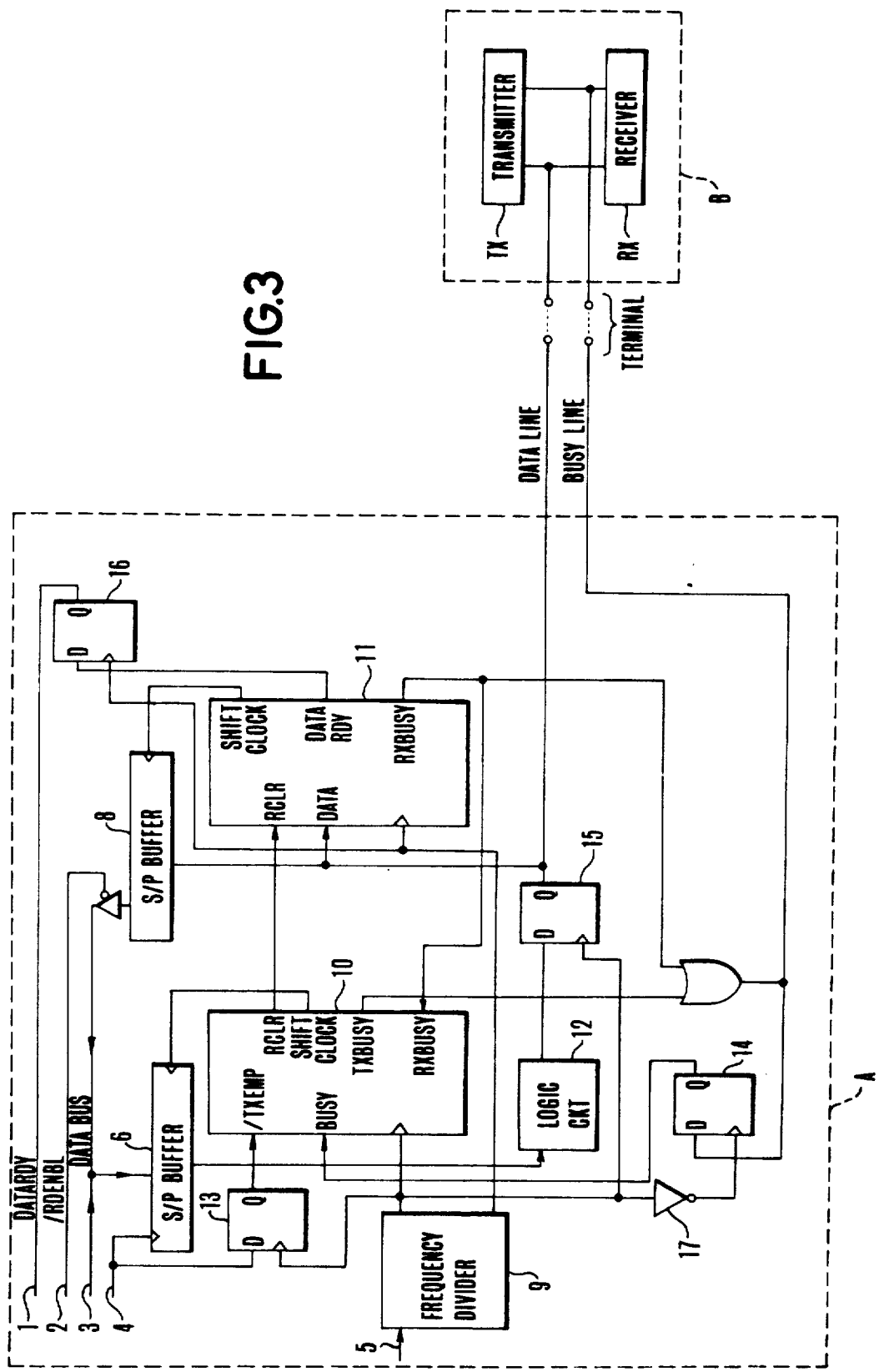
FIG. 3 is a block diagram illustrating the construction of an embodiment of a transmitter-receiver according to the present invention.

FIG. 3 in an electrical circuit diagram, partly in block form, illustrates the details of the construction and arrangements of the elements of a transmitter-receiver employing the present invention in each of the stations A and B.

In block A, 1 is a flag signal (DATARDY) having a function of informing a central processing unit or CPU (not shown) that data are present in the receiver.

2 is a reading out command signal (/RDENBL) by which the received data are read out to the CPU through a data bus 3.

4 is writing data (WRDATA) which are to be stored in a buffer 6.

5 is a standard clock signal.

6 is the data buffer having a parallel-in serial-out function.

8 is another data buffer of a serial-in parallel-out function.

9 is a frequency divider for producing clocks for the transmitter and the receiver.

10 is a transmission status counter.

11 is a reception status counter.

12 is a logic circuit (bit adding circuit) for inserting a start bit and a stop bit into before and after the data to be transmitted.

13 is a latch circuit for a flag (/TXEMP) representing that there are no data to be sent to the transmitter.

14 is a latch circuit for the transmitter to check the busy line.

15 is a latch circuit for latching the transmitting data.

16 is a latch circuit for latching the flag (DATARDY).

Figure 4:
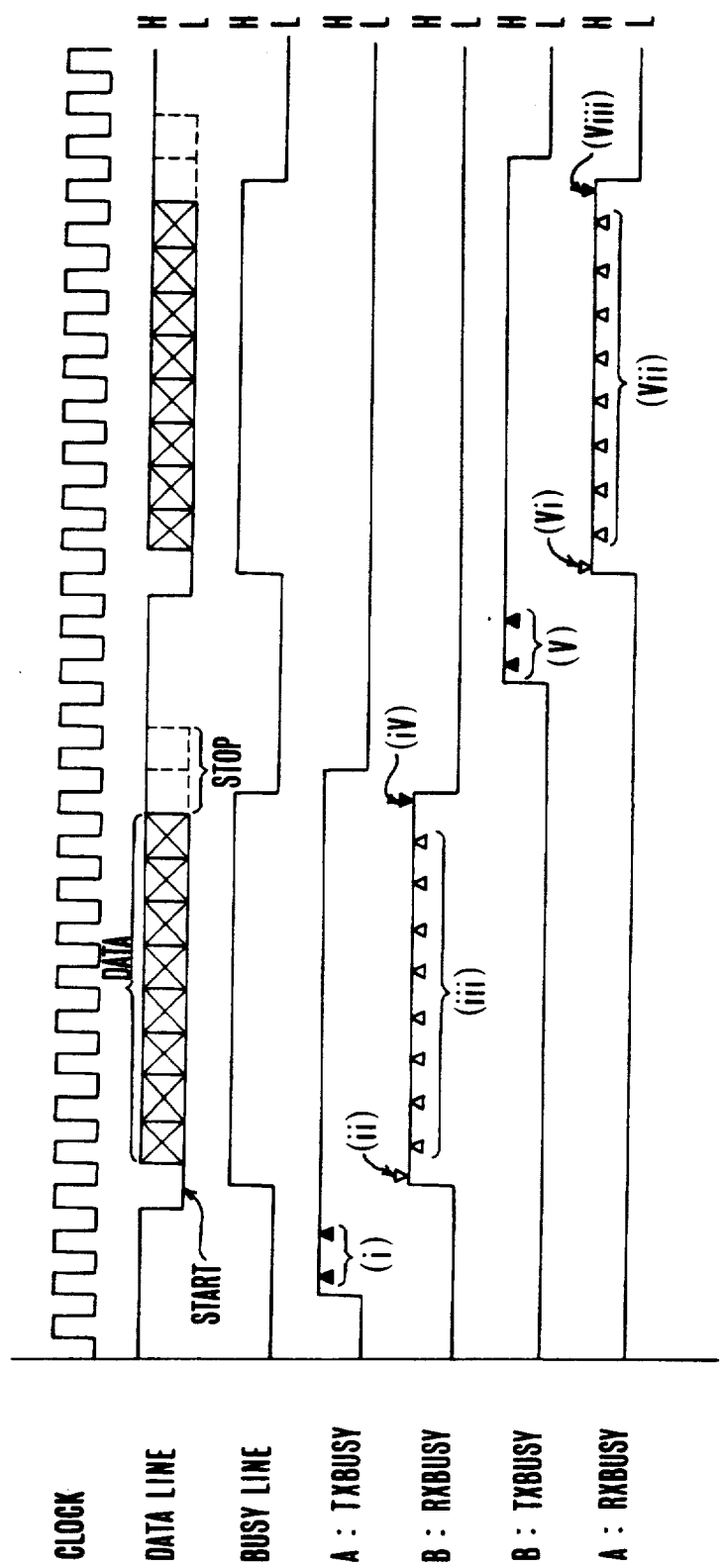
FIG. 4 is a pulse timing chart illustrating a manner in which the system of FIG. 3 operates.

The operation of transmitting 8-bit data from the station A to the station B is next described by reference to the timing chart of FIG. 4.

The transmitter in the station A first sets TXBUSY to high level. As, at this time, the level of the busy line is latched in the latch 14 in synchronism with the inverted clock by an inverter 17, the transmission status counter 10 performs checking two times in timings (i).

Since, at the aforesaid points in time, BUSY=L is detected, data (8 bits) starts to be transmitted. It is to be noted here that the logic circuit 12 sets the data line to "L" for the length of time equal to one bit as the start bit START preceding the 8-bit data. After the 8-bit data have been transmitted, the logic circuit 12 changes the data line to "H" at which it is maintained for the length of two bits as the stop bit STOP.

Such transmitting data for one clock are latched by the latch circuit 15. It sends the data to the station B through the data line.

Meanwhile, in the station B, the start bit START is checked in the timed relation (ii). So the station B knows that the data have sent in. The reception status counter included in the receiver RX of the station B sets RXBUSY to "H". As a result, the line A: TXBUSY in the station A and the line B: RXBUSY in the station B both become "H". So, the busy line takes BUSY=H. Since, at this time, the reception status counter 11 in the station A receives a receiver clear (RCLR) signal from the transmission status counter 10 of its own station, the receiving operation is inhibited. In the station B, on the other hand, since its transmission status counter (not shown) receives an RXBUSY signal of high level from its reception status counter, the transmitting operation is inhibited.

The receiver RX in the station B reads in the transmitted 8-bit data in timed relation (iii). And, in final, upon detection of the stop bit STOP in timed relation (iv), it sets the latch circuit 16. So that the flag DATARDY lets the CPU know that the data have been and are received and then changes the line B: RXBUSY to "L" (low level). Thus, the receiving ends.

Conversely when the data transmission takes place from the station B to the station A, the transmitter in the station B first checks the busy line by setting the line TXBUSY of the transmission counter to "H" (in timing (v)). After the termination of checking of the busy line, the transmitter in the station B sends out the start bit, 8-bit data and stop bits in sequence.

Meanwhile, the receiver in the station A after having detected the start bit in timed relation (vi) reads in the data (in timed relation (vii) At the last, by checking the stop bit, it sets the flag DATARDY in timed relation (viii), causing A: RXBUSY=L. As a result we have BUSY=L.

As has been described above, according to the embodiment of the invention, the use of one busy line enables the operating situation of the partner of the communication to be examined. This makes it possible to realize a half-duplex type serial data communication system of simplified form.

Also, in the embodiment, it is through terminals that the stations A and B are connected with each other as shown in FIG. 3. This implies that the paired stations are releasably connectable with each other, thereby giving a great advantage In more detail, since, according to the invention, one busy line suffices for grasping the operating situation of the communication partner, the necessary number of interconnection terminals can be reduced as compared with the prior art of having to employ at least two busy lines. The rate of occurrence of malfunction due to the poor contact between the interconnection terminals can be remarkably reduced.

Such an advantage becomes prominent when the system of the invention is installed in an image pickup apparatus (image forming apparatus) which comprises a body 100 and an interchangeable lens mounting 200 (accessory) therefor provided with respective transmitter-receivers each including a microcomputer or microcomputers, for example. In view of a very high frequency of attaching and detaching the lens mounting to and from the body, the reduction of the number of busy lines to a half will rapidly decrease the rate of encountering malfunctions due to the poor contact of the interconnection terminals.

Figure 6:
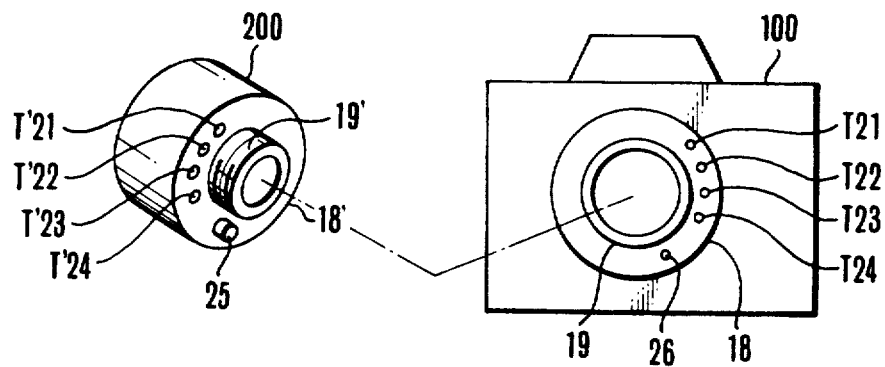
FIG. 6 is a perspective view of the outer appearance of an imaging apparatus comprising a body and an interchangeable lens mounting to which the invention is applied.

In FIG. 6, the body is provided with power, busy, data and ground terminals T21 to T24 respectively in a lens mount ring 18 having a screw-threaded portion 19.

A hole 26 is bored in the ring 18, behind which is a switch for detecting when the attaching of the lens to the body is completed, as an actuator pin 25 in an adapter 18' of the lens mounting enters through the hole 26. This adapter 18' has a screw-threaded portion 19' and interconnection terminals T' 21 to T' 24 arranged to contact with the terminals T21 to T24 respectively when the lens mounting is coupled with the body in an adjusted angular position by the pin 25-and-hole 26 connection.

As has been described above, according to the present invention, the structure of construction of such apparatus can be simplified thanks to the possibility for one busy line of grasping the operating situation of the transmitter-receiver of the partner station.

What is claimed is:

1. A multiple section serial data communication system for transmitting and receiving serial data comprising:

first and second stations, each station having a serial data transmitter and a serial data receiver;

a single conductor data line interconnecting such first station transmitter to such second station receiver and such second station trasnmitter to such first station receiver for data communication therebetween;

first and second transmit and receive status indicating and receiving means disposed at said first and second stations, respectively, said status indicating means generating a status signal indicating whether the station having said means is under communicating state or not;

a single conductor busy line interconnecting such first station status indicating means to such second station status indicating means for transmitting the status signal; and a single conductor reference line interconnecting said first station and said second station.

2. A serial data communication system of claim 1, wherein each of said first and second stations has means for changing the state of said conductor busy line and means for discriminating the state of said conductor busy line.

3. A system according to claim 1 wherein said data transmitter and data receiver in each station are arranged to effect sampling of signals on said single conductor data line, according to a change of the state of the signal on the single busy line detected by said transmit and receive status indicating and receiving means.

4. A system according to claim 1, wherein said data transmitter and data receiver in each station are arranged to effect sampling of the signals on said single conductor data line at predetermined time intervals after the change of the state of the signal on said single busy line.

5. A system according to claim 1, wherein said data transmitter in each station includes storing means for storing said data.

6. A system according to claim 1, wherein said data transmitter and data receiver in each station include storing means for storing the data of said data-line.

7. A system according to claim 1, wherein said first and second stations are apparatuses which are detachably connected with each other.

8. An apparatus comprising:
(a) means for transmitting data serially;
(b) means for receiving data serially;
(c) a single data terminal connected to said transmitting means and to said receiving means;
(d) means for producing a signal having states representing transmit or receive-related conditions of said apparatus, said producing means generating a signal indicating whether said apparatus is under communicating state or not;
(e) a single busy terminal connected to said signal producing means;
(f) detecting means for detecting the state of said busy terminal and providing output indication therefor controlling said transmitting means; and
(g) single ground terminal connected to said transmitting means and said receiving means.

9. An apparatus of claim 8,
control means for controlling the operation of said transmitting means and said receiving means in response to the output indication of said detecting means.

10. An apparatus of claim 8, further comprising:
control means responsive to said detecting means output indication for rendering said transmitting means operative to transmit data.

11. An apparatus of claim 9, wherein said:
control means responsive to said detecting means output indication for rendering said transmitting means operative to transmit data.

12. A communication system for an image pickup system comprising:

A) an optical apparatus including:
  (a) optical means for conducting radiation from an object to converting means provided in said apparatus;
  (b) a single data terminal;
  (c) means for transmitting and receiving serial data through said data terminal;
  (d) a single status terminal; and
  (e) status means connected to said status terminal for transmitting and receiving in a status signal indicating whether the apparatus is under communicating state or not through the single status terminal; and B) a detachable apparatus being detachable from said optical apparatus, said detachable apparatus controlling said optical apparatus and including:
  (a) a further transmitting and receiving single data terminal arranged to contact with said optical apparatus data terminal;
  (b) further means connected to said further data terminal for transmitting and receiving said serial data therethrough;
  (c) a further single status terminal arranged to contact with said optical apparatus status terminal; and
  (d) further status means connected to said further status terminal for transmitting and receiving a signal representing an operating situation of said transmitting and receiving means for controlling said further transmitting and receiving means.

13. An image pickup system of claim 12, wherein said optical apparatus status means includes:
  (a) detecting means for detecting said status means signal at said optical apparatus status terminal and providing output indication thereof; and
  (b) control means for controlling the operation of said optical apparatus transmitting and receiving means in response to the output indication of said detecting means.

14. An image pickup system of claim 12, wherein said detachable apparatus further status means includes:
  (a) detecting means for detecting said further status means signal at said detachable apparatus further status terminal and providing output indication thereof; and
  (b) control means for controlling the operation of said detachable apparatus further transmitting and receiving means in response to the output indication of said detachable apparatus detecting means.

15. An image pickup system of claim 12, wherein said optical apparatus is an interchangeable lens.

16. An image pickup system of claim 13 wherein said detachable apparatus is a body releasably attached to said interchangeable lens.

17. An accessory releasably attached to a body, said body having a first single data terminal for sending out and receiving in serial data, means for transmitting and receiving serial data through said first single data terminal and a first single status terminal for transmitting and receiving in a status signal indicating whether said transmitting and receiving means is under communicating state or not, comprising:
  (a) a second single data terminal for transmitting and receiving in serial data;
  (b) second means for transmitting and receiving serial data through said second data terminal; and
  (c) a second single status terminal for transmitting and receiving in the status signal for controlling said second means, said first data terminal being connected with said second data terminal and said first status terminal being connected with said second status terminal upon attachment of said accessory to said body.

18. An accessory of claim 17, further comprising:
  (a) detecting means for detecting a signal at said second status terminal and providing output indication thereof; and
  (b) control means for controlling the operation of said second transmitting and receiving means in response to the output indication of said detecting means.

19. An accessory of claim 17, wherein said accessory further comprises an optical system for collecting radiation incident on said optical system and means for generating serial data indicative of such collected radiation for transmission to said body.

20. An accessory of claim 17, wherein said serial data are information peculiar to said accessory.

21. A multiple station serial data communication system for transmitting and receiving serial data comprising:
first and second stations, each station having a serial data transmitter and a serial data receiver;
a single conductor data line interconnecting such first station transmitter to such second station receiver and such second station transmitter to such first station receiver for data communication therebetween;
first and second transmit and receive status indicating and receiving means at said first and second stations, respectively, said status indicating means generating a signal indicating whether the station having said means is in communicating state or not for controlling said data transmitter;
a single busy channel interconnecting such first station status indicating means to such second station status indicating means for transmitting the status signal; and a single conductor reference line interconnecting said first station and said second station.

22. A system according to claim 21, wherein said data transmitter and data receiver in each station are arranged to effect sampling of signals on said single conductor data line, on the basis of a change of the state of the signal of the single busy channel detected by said transmit and receive status indicating means.

23. A system according to claim 21, wherein said data transmitter and data receiver in each station are arranged to effect sampling of signals of said single conductor line at predetermined time intervals after the change of the state of the signal on said single busy channel.

24. A system according to claim 21, wherein said data transmitter in each station includes storing means for storing said data.

25. A system according to claim 21, wherein said data transmitter and data receiver in each station includes storing means for storing the data of said single conductor data line.

26. A system according to claim 21, wherein said first station and said second station are apparatuses which are detachably connected with each other.

27. A system according to claim 21, wherein said first station is an optical apparatus.

28. A system according to claim 21, wherein said second station is a body which is detachably connected to optical apparatus.

29. A multiple serial data communication system for transmitting and receiving serial data comprising:
   first and second stations, each station having a serial data transmitter and a serial data receiver;
   a data channel interconnecting such first station transmitter to such second station receiver and such second station transmitter to such first station receiver for data communication therebetween;
   first and second transmit and receive status indicating and receiving means at said first and second stations, respectively, said status indicating means generating a signal indicating whether the station having said means is under communication state or not for controlling said data transmitter;
   a single conductor busy line interconnecting such first station status indicating means to such second station status indicating means; and
   a single conductor reference line interconnecting said first station and said second station.

30. A system according to claim 29, wherein said data transmitter and data receiver in each station are arranged to effect sampling of signals on said single conductor data line, on the basis of a change of the state of the signal of the single busy channel detected by said transmit and receive status indicating means.

31. A system according to claim 29, wherein said data transmitter and data receiver in each station are arranged to effect sampling of signals of said single conductor data line at predetermined time intervals after the change of the state of the signal on said single busy channel.

32. A system according to claim 29, wherein said transmitter in each station includes storing means for storing said data.

33. A system according to claim 29, wherein said data transmitter and data receiver in each station includes storing means for storing the data of said single conductor data line.

34. A system according to claim 29, wherein said first station and said second station are apparatuses which are detachably connected with each other.

35. A system according to claim 29, wherein said first station is an optical apparatus.

36. A system according to claim 29, wherein said second station is a body which is detachably connected to said optical apparatus.

* * * * *

UNITED STATES PATENT AND TRADEMARK OFFICE
CERTIFICATE OF CORRECTION

PATENT NO. : 5,157,599
DATED : October 20, 1992
INVENTOR(S) : Ryosuke Miyamoto

It is certified that error appears in the above-identified patent and that said Letters Patent is hereby corrected as shown below:

```
[57], line  2.  Change "informations" to -- information --
[57], line  4.  Change "are" to -- is --
Col. 1, line 44.  Change "t" to -- to --
Col. 1, line 62.  Change "positions" to -- position --
Col. 1, line 67.  Change "informations" to -- information --
Col. 2, line  6.  After "of" insert -- a --
Col. 3, line 28.  Delete "for"
Col. 3, line 40.  After "in" insert -- a --
Col. 3, line 43.  Change "the" to -- those --
Col. 3, line 46.  Change "he" to -- the --
Col. 8, line  1.  Change "13" to -- 15 --
```

Signed and Sealed this

Twenty-sixth Day of October, 1993

Attest:

BRUCE LEHMAN

*Attesting Officer*     *Commissioner of Patents and Trademarks*